United States Patent [19]

Hunt

[11] 4,336,857
[45] Jun. 29, 1982

[54] VEHICLE SPEED-CONTROL SYSTEM AND ACTUATOR DEVICE

[75] Inventor: Norman Hunt, Leamington Spa, England

[73] Assignee: Associated Engineering Limited, Warwickshire, England

[21] Appl. No.: 136,596

[22] Filed: Apr. 2, 1980

Related U.S. Application Data

[63] Continuation-in-part of Ser. No. 902,592, May 4, 1978, Pat. No. 4,218,997.

[30] Foreign Application Priority Data

Apr. 7, 1979 [GB] United Kingdom ................. 7911813
Oct. 9, 1979 [GB] United Kingdom ................. 7935012

[51] Int. Cl.³ .............................................. B60K 31/00
[52] U.S. Cl. ................................... 180/177; 116/138; 123/360
[58] Field of Search ............... 180/177, 176, 175, 179, 180/171, 170, 271; 123/360, 351; 116/138, 110

[56] References Cited

U.S. PATENT DOCUMENTS

| | | | |
|---|---|---|---|
| 1,284,920 | 11/1918 | Nielson | 116/110 |
| 1,484,144 | 2/1924 | Marsh | 116/110 |
| 3,157,244 | 11/1964 | McMurray et al. | 180/177 |
| 3,381,771 | 5/1968 | Granger et al. | 180/176 |
| 3,556,245 | 1/1971 | Radin | 180/176 |
| 3,722,614 | 3/1973 | Sakakibara et al. | 180/176 |
| 4,218,997 | 8/1980 | Hunt | 180/179 X |

Primary Examiner—Joseph F. Peters, Jr.
Assistant Examiner—Milton L. Smith
Attorney, Agent, or Firm—Biebel, French & Nauman

[57] ABSTRACT

A motor vehicle speed-control system includes a bellows chamber having a movable wall connected to the engine throttle. The pressure of the gas in the chamber is controlled by two electromagnetic valves, the first electromagnetic valve being energized with electrical pulses to repetitively connect the bellows chamber alternatively to atmosphere and vacuum, and the second electromagnetic valve being spring-biassed so that, when deenergized, it vents the chamber to atmosphere to ensure rapid closure of the throttle, and when energized, closes the said vent. An auxiliary fail-safe brake-pedal valve is provided. An audible signal is produced by a flow of air in the event of malfunctioning of the actuator device.

3 Claims, 9 Drawing Figures

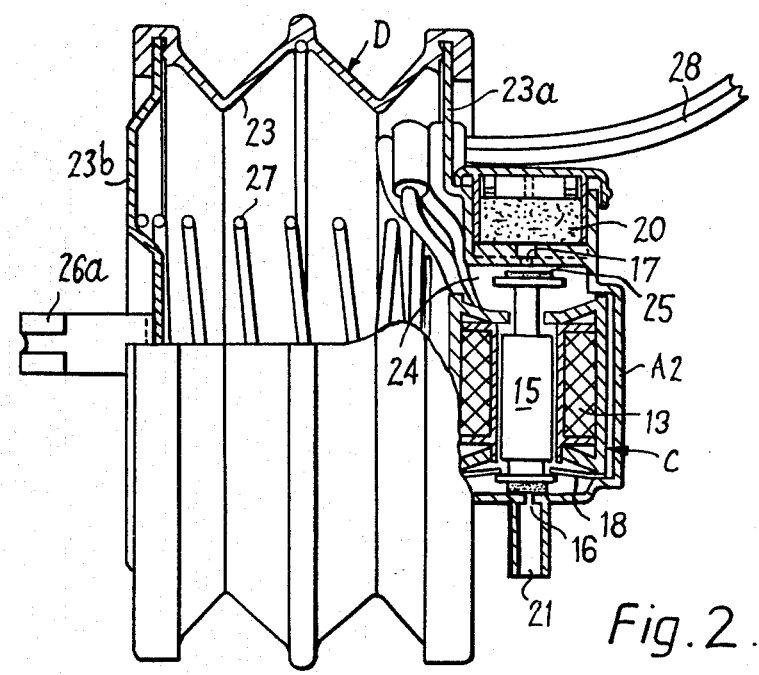
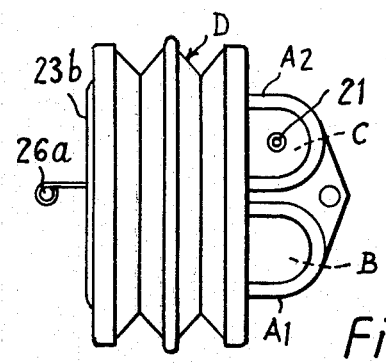
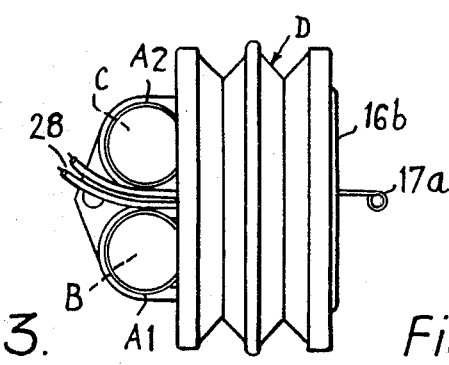
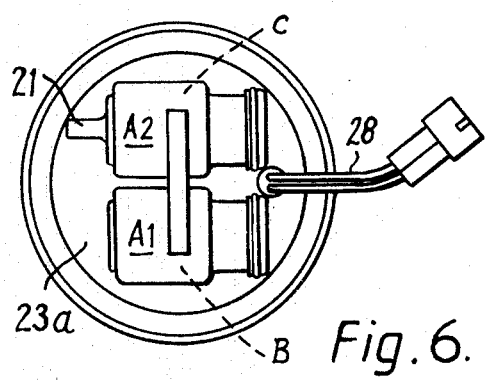
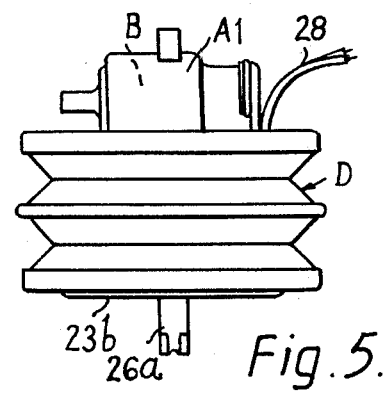

VEHICLE SPEED-CONTROL SYSTEM AND ACTUATOR DEVICE

RELATED CASE

This application is a continuation-in-part of my copending application Ser. No. 902,592 filed May 4, 1978, and now U.S. Pat. No. 4,218,997 issued Aug. 26, 1980.

FIELD OF THE INVENTION

The present invention relates to speed-control systems for motor vehicles and actuator devices therefor, whereby the vehicle may be maintained at a predetermined speed. Such speed-control systems are disclosed in British patent specifications Nos. 1386961 and 1486821.

PRIOR ART

British patent specification No. 1486822 discloses an actuator device comprising a chamber partly bounded by a movable wall and connected to atmosphere through a permanently open orifice, and an electromagnetic valve which is maintained in a closed position when de-energized and which controls the connection to said chamber of a source of gas at other than atmospheric pressure, when said valve is open. In one embodiment the chamber comprises a relatively fixed wall and a relatively movable wall interconnected by a bellows, and a spring within said chamber to urge said bellows to an extended position, whereby the connection to said chamber of a source of gas at a reduced pressure through said electromagnetic valve causes said bellows to contract against the force of said spring. The movement of the relatively movable wall with expansion or contraction of the bellows causes movement of the throttle valve or the like of an internal combustion engine to be controlled.

It has been found that under certain operational conditions the inflation rate of the bellows with atmospheric air in order to cause closure of the throttle valve is insufficient, and also that the actuator device does not inherently "fail-safe", i.e. return to a closed throttle position, if the electromagnetic valve should jam for any reason, or if the valve return spring should fail, or the air orifice becomes blocked, or if an electrical fault should develop such that the electromagnetic valve remains energized.

SUMMARY OF THE INVENTION

It is an object of the present invention to provide an improved construction of actuator device in which the electromagnetic valve is double-acting, that is in one end position it closes off the bellows from the source at other than atmospheric pressure, e.g. vacuum, and opens the bellows to atmosphere, and in its other end position closes off the bellows from atmosphere and connects the bellows to the source at other than atmospheric pressure, the valve being energized by electrical pulses which determine the operation of the valve. The actuator device is provided with a second electromagnetic valve which acts as a dump valve, when de-energized, is spring-biassed to vent the bellows to atmosphere more rapidly than is possible through the connection to atmosphere associated with the first electromagnetic valve, thus ensuring rapid closing of the engine throttle upon disengaging the vehicle speed-control system. While the speed-control system is engaged the second electromagnetic valve is energized and closes the said vent.

Circumstances can arise in which the second electromagnetic valve of the actuator device could fail to operate properly, for example due to this control valve failing to de-energize or sticking with its vent closed, which would inhibit rapid throttle closure upon the speed control system being disengaged, with consequent increased risk of an accident occurring.

A feature of the invention is to provide additional safety means which can be rapidly brought into operation to reduce the risk of accident in the event of such failure and which provides an additional safeguard during normal driving. To this end the invention provides an auxiliary driver-controlled valve which, when opened, will rapidly vent the bellows to atmosphere in the event of the said electromagnetic control valve failing to open its vent to atmosphere. This auxiliary valve thus acts as an auxiliary dump valve in the event of malfunction of the dump valve action of the said electromagnetic control valve of the actuator.

Since it is natural for a driver to actuate the vehicle brakes in the event of an emergency, usually by depressing the brake pedal, this auxiliary dump valve is preferably opened by actuation of a brake operating member.

A further object of the invention is to provide a simple and inexpensive system for producing an audible signal in the event of a malfunction of the actuator device necessitating actuation of the auxiliary dump valve to vent the actuator to atmosphere. To this end, the audible signal is produced by causing the consequent flow of gas through the auxiliary dump valve to flow through a sound-producing device, known per se, such as a resonator or reed device. Such an audible device, which may conveniently be connected in the conduit between the auxiliary dump valve and the actuator device, will produce an audible warning signal by the flow of venting air therethrough in the event of malfunctioning of the second electromagnetic control valve.

The audible device conveniently comprises a known resonator or reed device in a housing which is closed except for an inlet and an outlet. The outlet may be connected to a source of suction, such as the engine intake manifold, and the inlet be openable to the atmosphere by the control valve means which is conveniently located at the free end of a pipe leading from the audible device inlet and positioned where the operating condition is to be detected. Or the differential gas pressure may alternatively be between a zone at superatmospheric pressure, such as the pressure in an engine supercharger, and a zone at atmospheric pressure or vacuum.

A further object of the invention is therefore to provide a simple and inexpensive system for producing an audible signal when a particular operating condition (e.g. transgression of a threshold or malfunctioning) of the engine or some other component of the vehicle arises. To this end, the audible signal is produced by flow of gas through a device, known per se, having an inlet and an outlet for the flow of gas therethrough, said inlet and outlet being connected respectively to a first zone of gas at a first pressure and a second zone of gas at a lower pressure, the gas flow path through said device from said first zone to said second zone including valve means which is normally closed and opens in response to the existence of said operating condition to be indicated.

BRIEF DESCRIPTION OF THE DRAWINGS

The invention will now be further described by way of example, with reference to the accompanying drawings, in which:

FIG. 2 is a side view, partly cut-away, of one practical embodiment of the actuator device of FIG. 1;

FIGS. 3 to 6 are, respectively, further side views and an end view, on a smaller scale, of the actuator device shown in FIG. 2;

DESCRIPTION OF THE PREFERRED EMBODIMENTS

Figure 7:
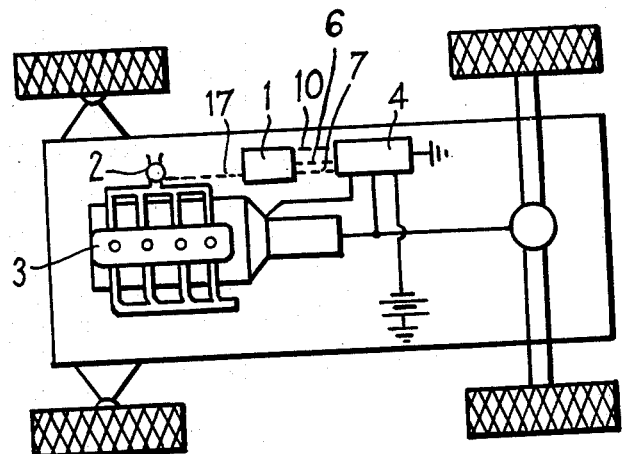
FIG. 7 is a schematic representation of a vehicle fitted with an actuator device as shown in FIG. 1 to 6.

The actuator device shown in FIGS. 1 to 6 is intended to be employed in conjunction with, and form part of, a speed-responsive system for motor vehicles, such as is described in the aforementioned specifications Nos. 1386961 and 1486821, whereby a vehicle may be maintained at a predetermined speed. Briefly, as shown in FIG. 7, the actuator device 1 is connected to the carburettor throttle valve, fuel injection pump rack, or other speed control device or mechanism 2 associated with the inlet manifold of an internal combustion engine 3 of a road or other vehicle. The actuator device 1 controls the opening and closing of the throttle valve 2 in dependence upon signals from an electronic control circuit 4 of the speed-responsive system, which detects various operating parameters or conditions of the engine and/or vehicle.

Figure 1:
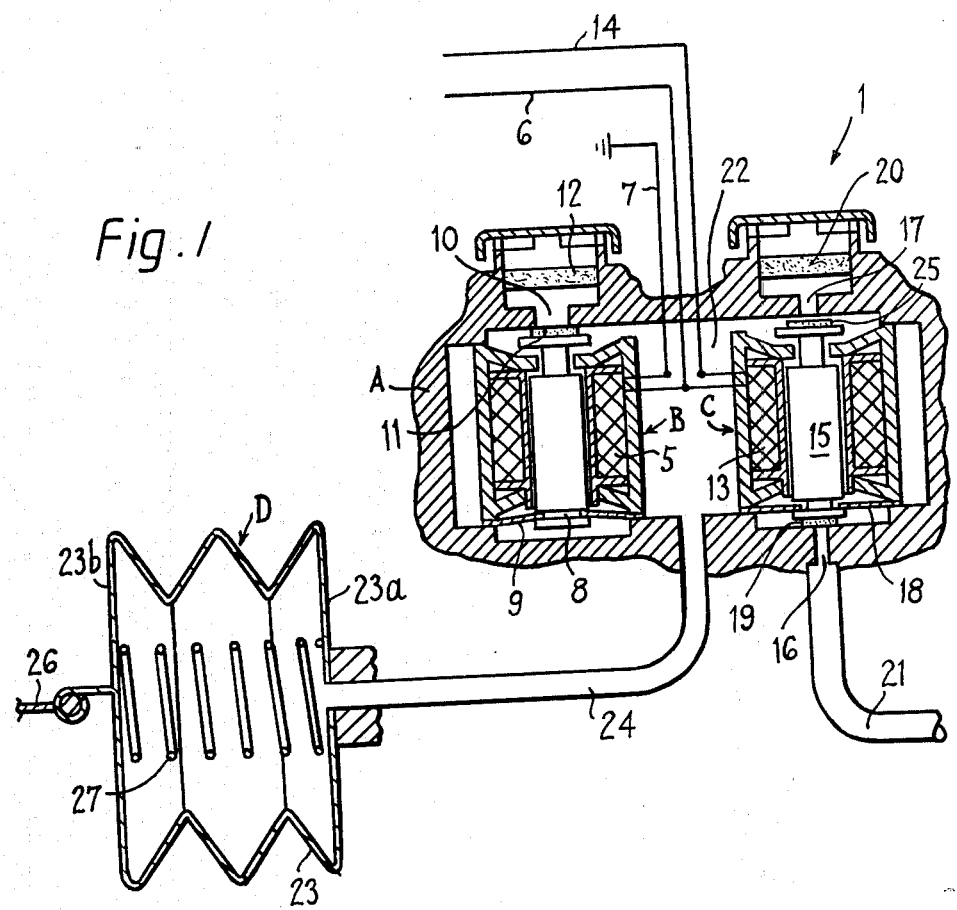
FIG. 1 is a diagrammatic cross-section of an actuator device according to the invention.

Referring to FIG. 1, the actuator device basically comprises a body A defining a chamber containing two electromagnetic control valves B and C, the chamber being connected to a bellows device D whose movement is employed to control the throttle valve 2 or the like of the internal combustion engine 3 (FIG. 7).

More specifically, the solenoid winding 5 of the electromagnetic control valve B is supplied with a D.C. voltage, e.g. in the range 12.5–18.0 volts, through a wire 6 from the control circuit 4 whenever the speed-responsive system is engaged to control the vehicle speed. A wire 7 is connected to a suitable grounding point on the vehicle to complete the circuit. In the engaged condition of the system, armature 8 is pulled upwards (as shown) by the energized solenoid winding 5 against the force exerted by a leaf spring 9, to close an orifice 10 in the body A by means of a valve or seal face 11. Orifice 10 is connected to atmosphere through a filter 12.

In the engaged condition of the speed-responsive system, the solenoid winding 13 of electromagnetic control valve C is also supplied with D.C. voltage through wire 6, and this voltage is pulsed at a frequency of 20 Hz through wire 14. The mark-to-space ratio of these pulses is infinitely variable by means of the control circuit 4 of the speed-responsive system, between the limits of 0 milliseconds and 50.0 milliseconds (corresponding to fully "off" and fully "on" conditions).

The armature 15 is responsive to the pulses supplied to the solenoid winding 13 and moves between orifices 16 and 17 in proportion to the mark-to-space ratio of the pulses. As shown in the drawing, the armature 15 is drawn upwards by the electromagnetic force exerted against a leaf spring 18. The actual amount of movement and the time for which a lower valve or seal face 19 leaves orifice 16 is proportional to the pulse applied to solenoid winding 13. Orifice 17 is connected to atmosphere through a filter 20.

A pipe 21 connects orifice 16 to the inlet manifold of the internal combustion engine or some other sub-atmospheric pressure source. The pulses applied to armature 15 thus allow air to be withdrawn, by way of seal face 19, from the chamber 22 of body A and from bellows 23 of the device D, which is connected to the chamber by way of pipe 24, while also allowing air at atmospheric pressure to enter the chamber 22 through filter 20 and orifice 17 by way of a valve or seal face 25. The bellows has a relatively fixed wall 23a, and a relatively movable wall 23b which is connected through a wire 26, or similar linkage, to control the throttle valve 2 (FIG. 5) of the internal combustion engine. A spring 27 within the bellows urges the walls 23a and 23b away from each other.

Due to the flow rates, the overall volume of the space formed by the cavities within the chamber 22 and within the bellows 23, and also due to the response of the system so formed, these suction and air pulses provide a substantially steady pressure within the bellows 23, which may be varied between atmospheric pressure and the sub-atmospheric pressure in pipe 21 as a function of the width of the electrical pulses applied to armature 15, to deflate or inflate the bellows, the action of the atmospheric pressure surrounding the bellows urging the bellows to the deflated position and the return spring 27 urging the bellows to the inflated position. As viewed in FIG. 1, increasing the electrical pulse width will cause the throttle control wire 26 to move to the right as the bellows contract, and decreasing the electrical pulse width will cause the wire 26 to move to the left as the bellows expand.

The response characteristics required to produce smooth operation of the throttle wire 26 during control of vehicle speed are such that the maximum inflation rate of the bellows 23 by means of fully opening the orifice 17 is insufficient to satisfy specified regulations governing throttle closure under certain operating conditions. For this reason, the solenoid winding 5 may also be de-energized at such times, allowing additional air to be drawn in through filter 12 and orifice 10, thus reducing the inflation time for the bellows 23 and enabling the specified regulations to be satisfied. Additionally, the orifice 10 provides a fail-safe mechanism should the armature 15 jam for any reason in the upward position, since orifice 10 is arranged dimensionally to be sufficiently large to allow full inflation of the bellows 23 when the seal face 11 is retracted, even with the valve face 19 also fully retracted and allowing maximum gap at orifice 16 to the source of sub-atmospheric pressure.

Additionally, a further fail-safe feature is provided by orifice 10 should any other electrical fault develop in the actuator device or its control circuit, since switching or fusing of the supply of the voltage to the solenoid winding 13 via wire 6 will also allow the leaf spring 9 to open orifice 10 and inflate the bellows 23 under the action of spring 27, thus restoring the throttle mechanism to the closed or off position.

FIGS. 2 to 6 show a practical embodiment of the actuator device shown schematically in FIG. 1, and corresponding parts have been designated by the same reference numerals. Thus, the actuator device of FIGS. 2 to 6 includes a bellows device D having a relatively movable wall 23b carrying a connector 26a connectable to the throttle valve controlling wire (not shown).

The fixed wall 23a is formed with housings A1 and A2 defining cavities or chambers respectively containing the two electromagnetic control valves B and C, and which communicate directly with the interior of the bellows device D via connections or ports 24. The two electromagnetic control valves B and C are arranged side-by-side within their respective cavities, only the valve C being visible in FIG. 2. The various connecting wires to supply the solenoid windings are included in the conductors 28 and through a connection made to the conductive wall 23a.

The construction of the practical embodiment of the present invention as shown in FIGS. 2 to 6 is compact and reduces the volume of air between the bellows chamber and the chambers housing the electromagnetic control valves, thereby reducing the response time of the actuator device.

Figures 8, 9:
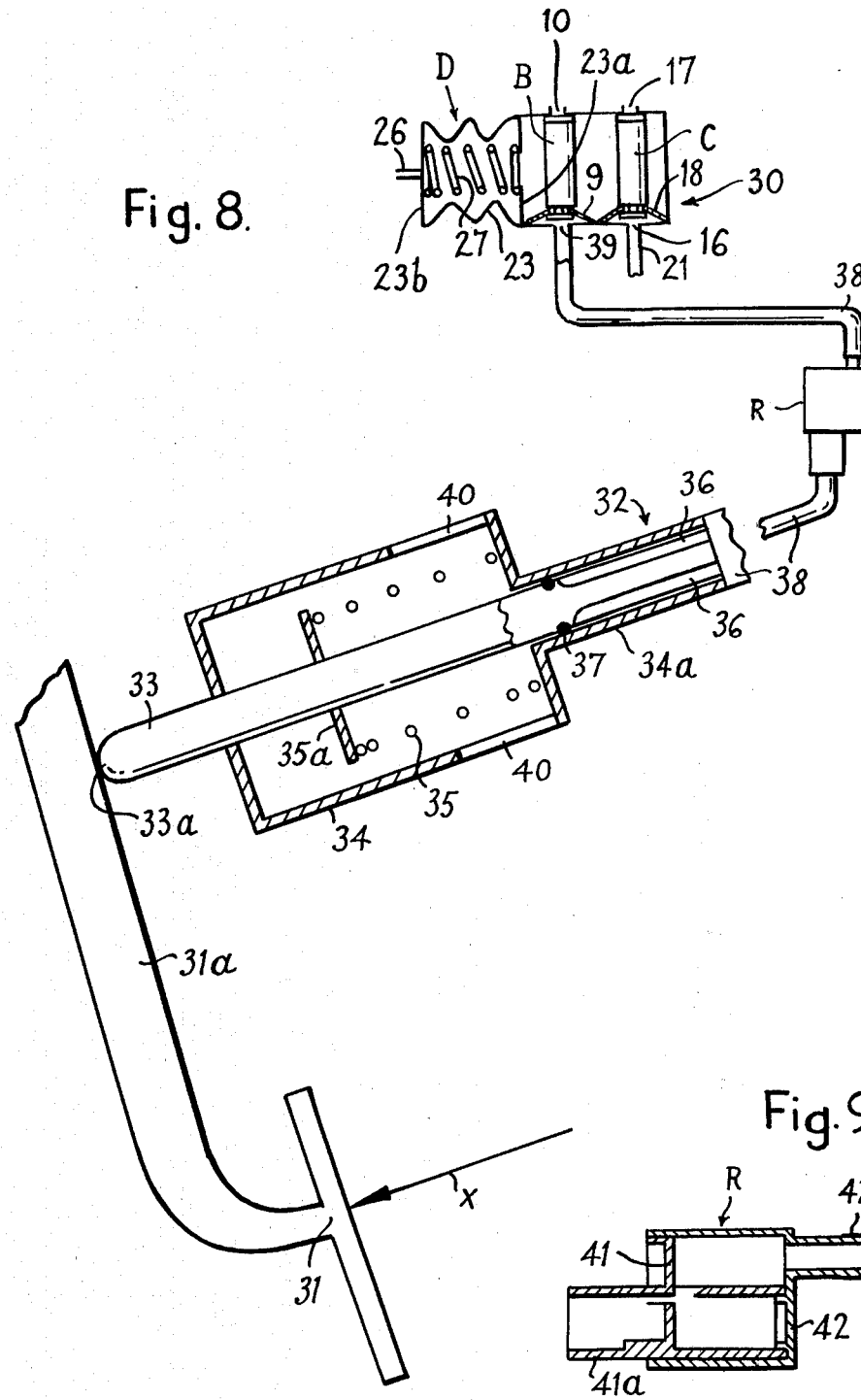
FIG. 8 is a diagrammatic representation of a vehicle speed-control system according to a modification of the invention.
FIG. 9 is a cross-section through one embodiment of a suitable audible signal producing device, known per se.

FIG. 8 shows a way of incorporating a brake-pedal-operated auxiliary dump valve in the speed control system to provide additional safety means which can be rapidly brought into operation in the event of malfunctioning or delay in functioning of the electromagnetic control valve B. The actuator device is diagrammatically represented at 30 and its components are referenced by the same references as used in the embodiment of FIG. 1. The vehicle brake pedal is shown at 31. An auxiliary dump valve 32 is mounted adjacent to the brake pedal and has one end 33a of its operating rod 33 bearing on the arm 31a of the brake pedal. The operating rod passes through the housing 34 of the control valve and is surrounded by a spring 35 extending between one end of the housing and an abutment 35a on the operating rod, such that when the brake pedal is depressed in the direction of the arrow X to apply the vehicle brakes, the spring urges the operating rod to the left as viewed in FIG. 1. The other end of the operating rod can slide in a tubular end 34a of the housing 34 and carries longitudinal grooves or flutes 36 which in cooperation with a scaling ring 37 form a valve member. The tubular end 34a is connected by means of a pipe 38 to an orifice 39 controlled by the electromagnetic control valve B and located at its end opposite to that adjacent the orifice 10 leading to atmosphere. The housing 34 of the control valve is provided with apertures 40 to allow atmospheric air to enter the housing and as soon as the control rod 33 moves to the left upon operation of the brake pedal, the sealing ring 37 is moved off its seating so that the end of pipe 38 is opened to atmospheric air.

The pipe 38 may incorporate a resonator R to produce an audible warning if air flows through the pipe 38 to the actuator device and thereby indicate a malfunctioning of the actuator device, as will hereinafter be described.

If the actuator device 30 is operating normally, when the electromagnetic control valve B is de-energized, the orifice 39 is blocked by the valve B under the action of the spring 9, and therefore no air flow takes place through the pipe 38 and resonator R and inflation of the bellows 23 is effected via the orifice 10 of the control valve B, which is then open, thus restoring the engine throttle or other speed control member to the closed or off position. However, if a fault occurs such that the electromagnetic control valve B does not operate to open the orifice 10 to atmosphere, then upon operation of the brake pedal 31, atmospheric air is fed via the valve 32, 37 through the pipe 38 and resonator R to the orifice 39, which is now open, thereby allowing the bellows 23 to be inflated by the flow of air through the pipe 38 and so closing the engine throttle or its equivalent. The valve and flow passages are dimensioned to permit air flow therethrough at a rate sufficient to maintain the interior of the bellows 23 at approximately atmospheric pressure irrespective of the position of the electromagnetic control valve C. This air flow through the resonator produces an audible warning signal indicating that a fault condition exists.

The electromagnetic control valve B may, for example, fail to open to atmosphere through its normal orifice 10 either due to the valve sticking with the orifice 10 closed, or due to an electrical fault such that the energizing coil of this control valve remains energized.

FIG. 9 shows one suitable form of resonator R, which may be made of a plastics material. As shown in FIG. 2, the resonator comprises two component parts 41,42 which are secured together. The part 41 includes a tubular inlet 41a which is connected to the auxiliary dump valve 32 by one section of pipe 38. The part 42 includes a tubular outlet 42a offset with respect to, and extending in the opposite direction to, inlet 41a. Another section of pipe 38 connects the outlet 42a to the orifice 39 of the actuator device.

In order that the vehicle should respond normally to all braking actions of the driver, the speed-control system can be disengaged at any time by light pressure on the vehicle brake pedal, which operation actuates an electric switch which causes the electronic control circuit to de-energize the solenoids 5 and 13 of the electromagnetic control valves B and C, valve B, by opening its orifice 10, rapidly venting and inflating the bellows 23.

It may be arranged that, in normal operation, the brake-operated dump valve 32 is phased to open shortly before the brake-operated disengagement switch operates to de-energize valve B and orifice 39 shuts. In this case, an audible signal will occur for the short period during which the valve B commences to open its orifice 10. Thus, the occurrence of a short audible signal when the brake is operated indicates to the driver that the system is operating correctly.

Alternatively, the phasing may be arranged, in normal operation, to allow valve B to shut orifice 39 before valve 32 opens, and in this case there will be no audible signal unless there is malfunctioning of valve B.

Since, in normal operation, both valve 32 and orifice 39 of valve B will only be open for very short periods of time, or not at all, as described above, there will not be a continuous stream of air through valve 32 and therefore the need to provide a filter to prevent entry of foreign matter into the actuator device is, in most cases, avoided.

I claim:

1. A motor vehicle speed-control system for maintaining the vehicle speed substantially constant, comprising an electronic control circuit operable to sense the speed of the vehicle and produce a pulsed output of which the mark-to-space ratio of the pulses varies in dependence upon a comparison between the actual vehicle speed and a selected vehicle speed, an engine speed control adjustable by an actuator device including a chamber having a movable wall connected to said engine speed control, the chamber wall being movable by changing the pressure of the gas in the chamber under control of two electromagnetic valves, the first electromagnetic valve being energized by said electrical pulses to connect the chamber to first and second sources of gas pressure in accordance with the mark-to-space ratio of the pulses, and the second electromagnetic valve being spring biassed so that, when de-energized, its valve moves to a first position in which it opens a connection between the chamber and said first pressure source and, when energized, the valve moves to a second position in which it closes said connection, the actuator device adjusting the engine speed-control to reduce the engine speed as the gas pressure in the chamber approaches said first pressure, characterized by an auxiliary dump valve which is normally closed and is opened by actuation of the vehicle brake pedal or other driver-actuable member to connect said first pressure source to said chamber through a further connection which is closed by said second electromagnetic valve when in its said first position and is opened when said second electromagnetic valve is in its said second position, the gas flow between the chamber and said first pressure source, when both the auxiliary dump valve and said further connection are open, being at a rate sufficient to cause the pressure in the chamber rapidly to approximate to and to be maintained approximately at said first pressure irrespective of the action of said first electromagnetic valve.

2. A system according to claim 1, characterized in that a device known per se, which produces an audible signal by a flow of gas therethrough, is connected to produce a signal when gas flows through both said dump valve and said further connection.

3. A vehcile driven by an internal combustion engine and having an automatic speed control system comprising a pneumatic actuator which adjusts the supply of fuel to the engine, and an electromagnetic valve arranged to vent the pneumatic actuator to atmosphere when the automatic speed control system is to be rendered inoperative, characterised by an auxiliary valve which is opened upon actuation of a vehicle brake operating member to connect the pneumatic actuator to the atmosphere by way of a conduit whereby to produce a gas flow through said conduit in the event of the electromagnetic valve failing to vent the pneumatic actuator to atmosphere, and, connected in said conduit, a device which produces an audible signal by a flow of gas therethrough.

* * * * *